United States Patent
Patil et al.

(10) Patent No.: US 10,331,768 B2
(45) Date of Patent: Jun. 25, 2019

(54) TAGGING TEXT SNIPPETS

(71) Applicant: Tata Consultancy Services Limited, Mumbai (IN)

(72) Inventors: Sangameshwar Suryakant Patil, Pune (IN); Girish Keshav Palshikar, Pune (IN); Apoorv Shrivastava, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/271,116

(22) Filed: Sep. 20, 2016

(65) Prior Publication Data
US 2017/0083484 A1 Mar. 23, 2017

(30) Foreign Application Priority Data
Sep. 21, 2015 (IN) .......................... 3586/MUM/2015

(51) Int. Cl.
*G06F 17/21* (2006.01)
*G06F 17/30* (2006.01)
(Continued)

(52) U.S. Cl.
CPC .......... *G06F 17/218* (2013.01); *G06F 16/334* (2019.01); *G06F 16/3326* (2019.01);
(Continued)

(58) Field of Classification Search
CPC .. G06F 17/218; G06F 17/2785; G06F 17/271; G06F 17/30648; G06F 17/30752;
(Continued)

(56) References Cited

U.S. PATENT DOCUMENTS 6,697,998 B1 * 2/2004 Damerau ............... G06F 16/355
715/260
8,463,593 B2 * 6/2013 Pell ....................... G06F 17/2785
704/9
(Continued)

FOREIGN PATENT DOCUMENTS

JP        2008-84203        4/2008

OTHER PUBLICATIONS

Patil, S., & Ravindran, B. (Apr. 2015). Active Learning Based Weak Supervision for Textual Survey Response Classification. In CICLing (2) (pp. 309-320).*

(Continued)

*Primary Examiner* — Edwin S Leland, III
(74) *Attorney, Agent, or Firm* — Finnegan, Henderson, Farabow, Garrett & Dunner LLP (57) ABSTRACT

The present subject matter discloses system and method for tagging set of text snippets with set of tags. A set of text snippet and set of tags are received as input by the system. Further, each tag comprises set of words, and for each word of the set of words, numeric weight is assigned based on frequency of the word and headword of the set of words. Further, same words and similar meaning words are determined from the tag and text snippets. Further, belief factor is computed for the tag by applying certainty factor algebra upon the numeric weight assigned to the same words and the similar meaning words. Further, the tag is assigned to the text snippet based on comparison of the belief factor with threshold. Further, feedback is received about the tagging done. Based on the feedback, knowledge base of the system may be updated for future tagging.

8 Claims, 6 Drawing Sheets

(51) Int. Cl.
*G06F 17/27* (2006.01)
*G06F 16/33* (2019.01)
*G06F 16/68* (2019.01)
*G06F 16/332* (2019.01)

(52) U.S. Cl.
CPC .......... *G06F 16/686* (2019.01); *G06F 17/271* (2013.01); *G06F 17/2705* (2013.01); *G06F 17/277* (2013.01); *G06F 17/2785* (2013.01); *G06F 17/2795* (2013.01)

(58) Field of Classification Search
CPC ............... G06F 17/2795; G06F 17/277; G06F 17/2705; G06F 17/30675
USPC .......................................................... 704/9
See application file for complete search history.

(56) References Cited

U.S. PATENT DOCUMENTS

| | | | | |
|---|---|---|---|---|
| 9,672,205 | B2* | 6/2017 | Miller | G06F 17/278 |
| 2008/0319735 | A1* | 12/2008 | Kambhatla | G06F 17/277 |
| | | | | 704/9 |
| 2010/0036829 | A1* | 2/2010 | Leyba | G06F 16/3344 |
| | | | | 707/739 |
| 2011/0119049 | A1* | 5/2011 | Ylonen | G06F 17/271 |
| | | | | 704/9 |
| 2011/0161067 | A1* | 6/2011 | Lesher | G06F 17/241 |
| | | | | 704/1 |
| 2011/0161068 | A1* | 6/2011 | Lesher | G06F 17/241 |
| | | | | 704/9 |
| 2011/0196670 | A1* | 8/2011 | Dang | G06F 17/2785 |
| | | | | 704/9 |
| 2012/0179453 | A1* | 7/2012 | Ghani | G06F 17/27 |
| | | | | 704/9 |
| 2013/0086072 | A1* | 4/2013 | Peng | G06F 16/9537 |
| | | | | 707/743 |
| 2014/0156743 | A1* | 6/2014 | Veda | G06Q 10/10 |
| | | | | 709/204 |
| 2016/0042359 | A1* | 2/2016 | Singh | G06Q 30/016 |
| | | | | 704/2 |
| 2017/0083484 | A1* | 3/2017 | Patil | G06F 17/218 |

OTHER PUBLICATIONS

Boubekeur, F. et al. "Using WordNet for Concept-Based Document Indexing in Information Retrieval," *SEMAPRO 2010: The Fourth International Conference on Advances in Semantic Processing*, Oct. 25, 2010. Florence, Italy: pp. 151-157.

* cited by examiner

Figure 6

TAGGING TEXT SNIPPETS

PRIORITY CLAIM

This application claims priority under 35 U.S.C. § 119 from India Application No. 3586/MUM/2015, filed on Sep. 21, 2015. The entire contents of the aforementioned application are incorporated herein by reference.

TECHNICAL FIELD

The present subject matter described herein, in general, relates to a method and a system for tagging text snippets, more specifically, tagging the text snippets using a set of tags organized in taxonomy.

BACKGROUND

In a survey coding process, a huge amount of responses is collected during a survey conducted in a particular domain in response of open-ended questions asked during the survey. Since, the questions asked during the survey are generally open-ended questions, the responses received are open-ended in nature. The responses, provided by respondents, typically tend to be extempore and are given in a free style, and hence they do not conform to standard rules of language. The respondent may be a person responding to the open-ended questions. The responses/answers of the open-ended questions may vary widely from one respondent to another respondent. The primary reason behind this variation is language usage and writing style of different persons responding to the open-ended questions. These responses (i.e., answers to the open-ended questions) are received in different formats such as hand-written papers, scanned copies, images, videos, and the like. These may be normalized in an electronic text data for analysis. Thus, the electronic text data received is considered to be unstructured in nature. To make sense out of such electronic text data which is considered to be unstructured, a survey coding is provided.

In the survey coding, a set of predefined tags or labels or codes may be provided for tagging the electronic text data (hereinafter electronic text data is referred to as 'text snippets'). The tagging is performed to classify these text snippets in a form understandable by various computer software for analysis. For tagging the text snippets, human coders are used which makes the survey coding subjective. The subjectivity is due to the varying level of domain knowledge, language skills, experience of the human coders, as well as inherent ambiguity in the text snippet or ambiguity due to large number of tags. For example, two different human coders may tag a text snippet differently. Also, it has been observed that, in some cases, even the same human coder assigns different tags to same text snippet at different times depending on training, domain understanding, and external factors such as pressure to complete the survey coding process under a tight schedule. Thus, maintaining uniformity while assigning the tags to the text snippets becomes a challenging task in the survey coding.

Another solution present in art for automating the survey coding process is based on text classification using supervised machine learning techniques. But, in such supervised machine learning techniques, the availability of labeled training data, before starting survey coding process, is one of a concern. In many cases, these labeled training data are not available readily and has to be created manually. Further, the cost and effort required for creating such labeled training data outweighs the benefits of using supervised learning techniques. Moreover, the system may have to refer domain-specific labeled training data each time and update the supervised learning model while assigning the tags to different set of electronic text data. The dependency of using such labeled training data results in an increase in computing time of a system during the survey coding. Thus, the requirement of such labeled training data in the supervised learning approach is another challenge in the survey coding process.

SUMMARY

This summary is provided to introduce aspects related to systems and methods for tagging a set of text snippets using set of tags are further described below in the detailed description. This summary is not intended to identify essential features of subject matter nor is it intended for use in determining or limiting the scope of the subject matter.

In one implementation, a system for tagging a set of text snippets with a set of tags organized in a taxonomy is disclosed. The system comprises a processor and a memory coupled to the processor for executing a plurality of modules stored in the memory. The plurality of modules comprises a receiving module, a feature extractor module, a determining module, a belief factor computing module, tag assigning module, and a feedback module. The receiving module receives a set of text snippets and a set of tags. Each tag of the set of tags comprises a set of words. Further, the feature extractor module determines a frequency of one or more words present in the tag of the set of tags. The feature extractor module may further determine a headword from the one or more words present in the tag by parsing the one or more words present in the tag of the set of tags. Further, the feature extractor module may assign a numeric weight to the one or more words based on the frequency and the headword. The numeric weight indicates relative importance of the one or more words in the tag with respect to other words present in other tags. Further, the determining module determines correspondences between the one or more words and words present in the set of text snippets, whereby the determining of the correspondences results in identification of a same word or a similar meaning word present in the tag. Further, the same word is determined by mapping the one or more words present in the tag with the words present in the set of text snippets, and the similar meaning word is determined by using a word-sense importance database. Further, the belief factor computing module computes a belief factor for the tag by applying a certainty factor algebra based upon the numeric weight of the same word and the similar meaning word. Further, the tag assigning module assigns the tag to the text snippet based upon a comparison of the belief factor with a threshold.

In another implementation, a method for tagging a set of text snippets with a set of tags organized in a taxonomy is disclosed. The method may be provided for receiving a set of text snippets and a set of tags. Further, each tag of the set of tags comprises a set of words. The method may be further provided for determining a frequency of one or more words present in the tag of the set of tags. Further, the method may be provided for determining a headword from the one or more words present in the tag by parsing the one or more words present in the tag of the set of tags. Further, the method may be provided for assigning a numeric weight to the one or more words based on the frequency and the headword. Further, the numeric weight indicates relative importance of the one or more words in the tag with respect to other words present in the other tags. Further, the method may be provided for determining correspondences between the one or more words and words present in the set of text snippets. Further, the determining of the correspondences results in identification of a same word or a similar meaning word present in the tag. Further, the same word is determined by mapping the one or more words with the words present in the set of text snippets, and the similar meaning word is determined by using a word-sense importance database. Further, the method may be provided for computing a belief factor for the tag by applying a certainty factor algebra based upon the numeric weight of the same word and the similar meaning word. Further, the method may be provided for assigning the tag to the text snippet based upon a comparison of the belief factor with a threshold. Further, the method provided for the receiving, the determining the frequency, the determining the headword, the assigning the numeric weight, the determining the correspondences, the computing, and the assigning the tag are performed by a processor.

Yet in another implementation a non-transitory computer readable medium embodying a program executable in a computing device for tagging a set of text snippets with a tag of a set of tags organized in taxonomy is disclosed. The program comprising a program code for receiving a set of text snippets and a set of tags. Further, each tag of the set of tags comprises a set of words. The program further comprises a program code for determining a frequency of one or more words present in the tag of the set of tags. The program further comprises a program code for determining a headword from the one or more words present in the tag by parsing the one or more words present in the tag of the set of tags. Further, the program comprises a program code for assigning a numeric weight to the one or more words based on the frequency and the headword. The numeric weight indicates relative importance of the one or more words in the tag with respect to other words present in other tags. The program further comprises a program code for determining correspondences between the one or more words and words present in the set of text snippets. Further, the determining of the correspondences results in identification of a same word or a similar meaning word present in the tag. Further, the same word is determined by mapping the one or more words with the words present in the set of text snippets, and the similar meaning word is determined by using a word-sense importance database. The program further comprises a program code for computing a belief factor for the tag by applying a certainty factor algebra based upon the numeric weight of the same word and the similar meaning word. Further, the program comprises a program code for assigning the tag to the text snippet based upon a comparison of the belief factor with a threshold.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for tagging set of text snippets by using set of tags organized in taxonomy are described. The present disclosure relates to survey coding process. The purpose of conducting a survey is to receive responses from individuals or a group in the particular domain. For example, a company may conduct a survey in a market research domain to seek customer's views/impression about products sold to the customers. During the survey, open-ended questions may be asked to the customers. These open-ended questions may be a positive sense question or a negative sense question or may belong to other sense question in order to get respondents' opinion. In one embodiment, the respondent may be a customer or any other person responding to the open-ended questions. In one embodiment, the other sense question may be a neutral sense question. For example, "what do you like about the product?" is a positive sense question. In another example, "what do you dislike about the product?" is a negative sense question. In an example, "what is the main idea behind the product advertisement?" is the other sense question. In response to the open-ended questions, the customers or the respondents express their feelings/emotions in natural language. In general, in the survey, a huge amount of responses may be received/collected in different formats like textual response, audio response, visual response, audio-visual response, and in a form of traditional paper-pen response. All these responses received may be converted into an electronic text data using suitable technologies. For example, a speech-to-text converter is used for converting the audio responses into the electronic text data. Similarly, optical character recognition technique is used for converting the visual/photo-scanned responses into the electronic text data. The electronic text data may be considered as a set of text snippets collected during a survey conducted in a particular domain. According to embodiments of present disclosure, the set of text snippets may also represents text data corresponding to social networks and mobile applications, clinical free text data, diagnosis reports, and request or complaints of end-users filed through online sources.

In the set of text snippets received, a significant variation may be noted due to geography and demography of the customers/respondents. Further, writing style and language used by the customers/respondents in the set of text snippets may also differ significantly. The responses received in the form of set of text snippets from various customers/respondents are considered to be unstructured and unorganized in nature. It becomes a tedious job for the organization conducting the survey to make sense of such set of text snippets which are unstructured and unorganized in nature. To make sense out of the set of text snippets, labeling or tagging or bucketing of the set of text snippets may be performed. The labeling or the tagging may be provided by applying the survey coding process upon the set of text snippets. In the survey coding process, a set of tags or labels are used which may be organized in a taxonomy. Using the set of tags, the set of text snippets may be tagged or labeled. The purpose of tagging or labeling of the set of text snippets is to convert the unstructured and not-so-easy to summarize set of text snippets into a quantitative form. Once the set of text snippets is labeled or tagged, the computer program analyzes the tagged data to come up with relevant observations and business insights which might be helpful for the company for meeting its business goals.

Further, the present disclosure overcomes the requirement of creating an initial labeled training data required for using supervised learning methods for tagging the set of text snippets in the survey coding process. Thus, the time and effort for creating the initial labeled training data may be avoided according to embodiments of the present disclosure. Further, the present disclosure also overcomes the limitation of existing regular expression based pattern matching technique which does not assign the tag to the set of text snippets in which words in the set of text snippets do not match a regular expression, but still describe same concept for which the regular expression is created. The present disclosure overcomes this limitation by using a concept oriented, semantic unit based feature representation of the tags present in the set of tags as well as the set of text snippets to be classified. This helps to capture similar notions expressed in different words.

The present disclosure further uses an active learning approach to solicit feedback from a user about the tags assigned to the set of text snippets. This user may be a human expert or a human coder or any other person capable for providing the feedback. The active learning helps to optimize the amount of feedback sought from the user and to adapt the classification process to survey and domain specific vocabulary and terminology and improves the accuracy of the survey coding process for the set of text snippets. This way, the present disclosure reduces amount of human intervention required in the survey coding process and in-turn helps to reduce the time and cost. Further, the feedback received from experts using the active learning approach about results of tagging is also used for updating a knowledge base. Initially, the knowledge base consists primarily of a lexical resource/database (e.g., a WordNet-type of lexical resource, in case of survey response tagging) as well as a word-sense importance database. The word-sense importance database helps in discriminating between different meanings of a word as well as their relative importance with the set of words associated with a tag in context of a specific question and/or a domain. Further, the knowledge base may also include pre-defined task-specific/domain-specific tagging rules, if any. Based on the feedback received from the experts, the knowledge base gets updated which helps in improving accuracy while assigning the tags to current set of text snippets as well as future/unseen set of text snippets. The continuous updating of the knowledge base on basis of the feedback makes the computing speed and accuracy, of the system, much faster and accurate respectively, while tagging the current and the next/future set of text snippets.

While aspects of described system and method for tagging the set of text snippets with the tag may be implemented in any number of different computing systems, environments, and/or configurations, the embodiments are described in the context of the following exemplary system.

Figure 1:
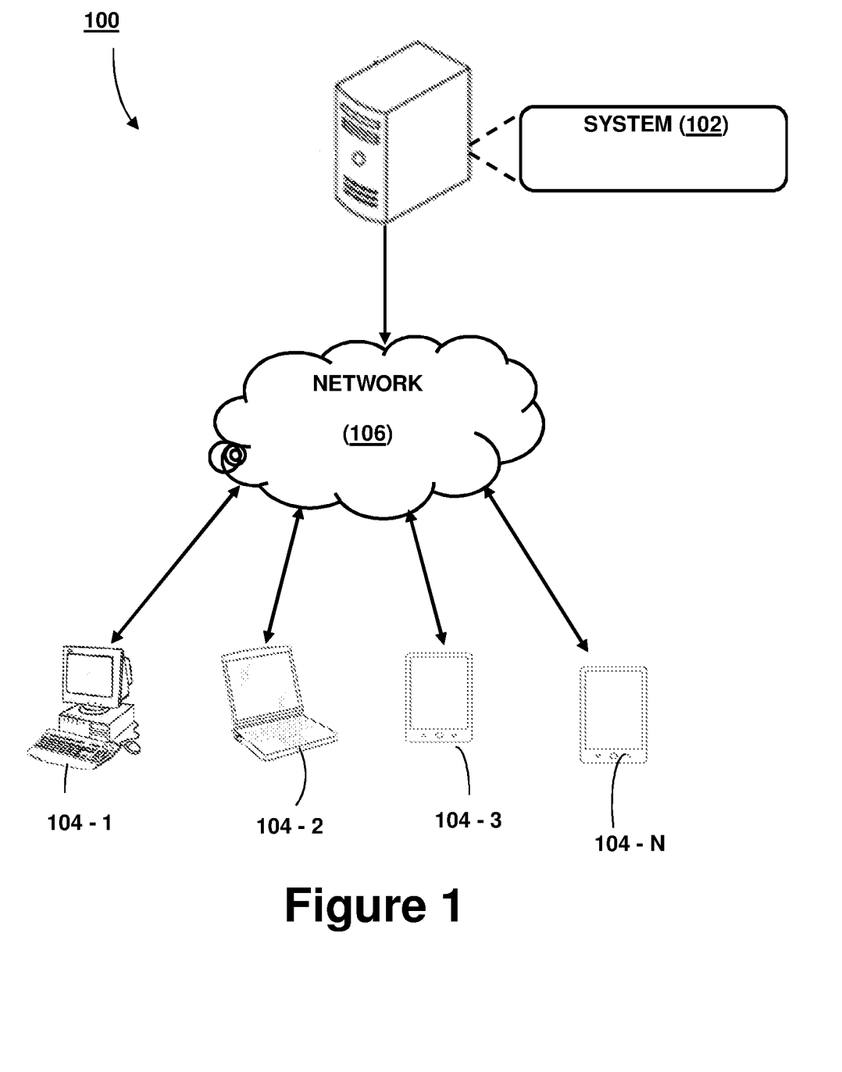
FIG. 1 illustrates a network implementation of a system for tagging a set of text snippets, in accordance with an embodiment of the present subject matter.

Referring to FIG. 1, a network implementation 100 of system 102 for tagging a set of text snippets is illustrated, in accordance with an embodiment of the present subject matter. In one embodiment, the system 102 facilitates the tagging of the set of text snippets with a set of tags. Although the present subject matter is explained considering that the system 102 is implemented for tagging the text snippets on a server, it may be understood that the system 102 may also be implemented in a variety of computing systems, such as a laptop computer, a desktop computer, a notebook, a workstation, a mainframe computer, a server, a network server, a tablet, a mobile phone, and the like. In one embodiment, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
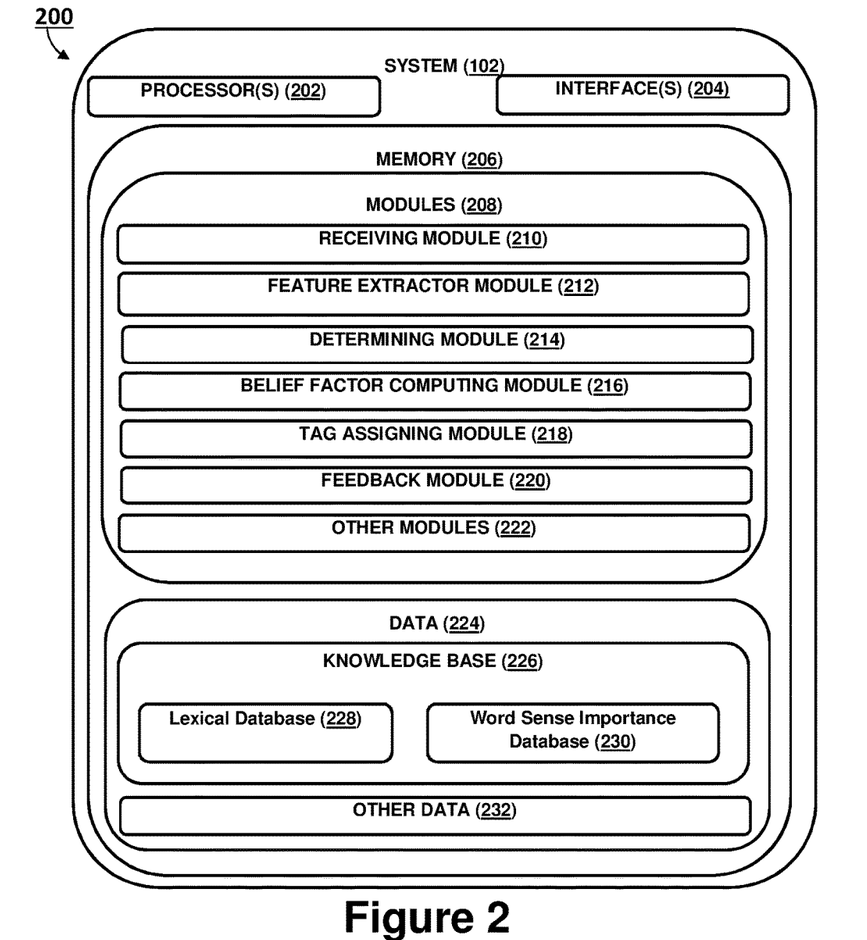
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 224.

The modules 208 include routines, programs, objects, components, data structures, etc., which perform particular tasks or implement particular abstract data types. In one implementation, the modules 208 may include a receiving module 210, a feature extractor module 212, a determining module 214, a belief factor computing module 216, a tag assigning module 218, a feedback module 220, and other modules 222. The other modules 222 may include programs or coded instructions that supplement applications and functions of the system 102.

The data 224, amongst other things, serves as a repository for storing data processed, received, and generated by one or more of the modules 208. The data 224 may also include a knowledge base 226, and other data 232. The knowledge base 226 further comprises a lexical database 228 and a word-sense importance database 230.

Figure 3:
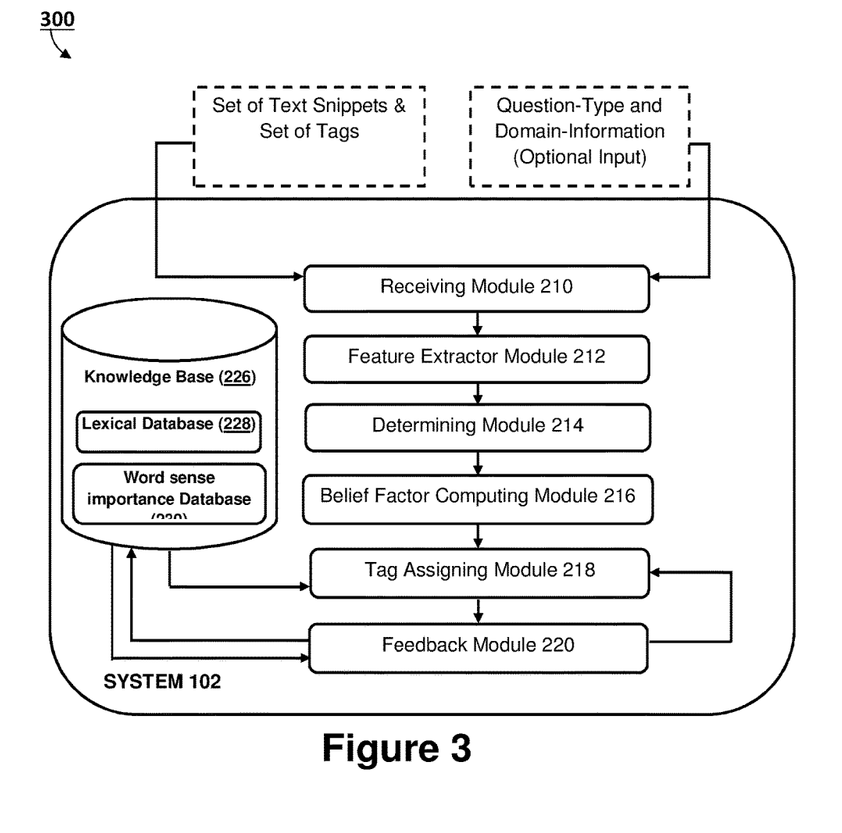
FIG. 3 illustrates a detailed working of the system, in accordance with an embodiment of the present subject matter.

Referring now to FIG. 3, which illustrates detailed working of the system, in accordance with an embodiment of the present subject matter. The system 102 is provided for tagging electronic text data i.e., a set of text snippets with a tag of a set of tags organized in a taxonomy. The present subject matter may be considered as one of an implementation of a survey coding process. As it has been already discussed above, that in the survey coding process a huge amount of responses is collected. The responses may be collected from different sources and in different forms such as text entered by end-users using online applications, textual responses to open-ended surveys, clinical free text such as adverse drug reaction reports, diagnosis reports, and end-user requests/complaints through online forums, websites, emails or through social networking websites. The responses may be also collected as a transcription of telephonic or audio/video recordings or in a form of traditional pen paper based surveys or forums. The responses collected from the different sources and in different formats may be converted into the electronic text data (i.e., considered to be the set of text snippets) using different technologies. The different technologies may be used such as speech-to-text convertor, optical character recognition based tools, and manual transcription and/or electronic data entry tool for converting the responses into the set of text snippets. The conversion of the responses into the set of text snippets results in a qualitative data. Further, the processing of tagging or coding of the set of text snippets (i.e., qualitative data) converts it into a quantitative data.

In one embodiment of present disclosure, the set of text snippets may be received in response of an open-ended question during a survey conducted in a particular domain. The set of text snippets represents answers received in response to the open-ended questions. After receiving the set of text snippets in response of the open-ended question, tagging or labeling of the set of text snippets is performed in the survey coding process. These open-ended questions may be a positive sense question or a negative sense question or may belong to other sense question. Thus, for the implementation of the survey coding process, a receiving module 210 of the system 102 may be configured to receive the open-ended question, the set of text snippets in response of the open-ended question, and the set of tags organized in the taxonomy. Further, the receiving module 210 may also receive domain information and a question type of the open-ended question as an input. However, this input (domain information and a question type) may be optional to the system 102. If this domain information input is available and the system 102 has similar domain information available in the word-sense importance database, then the corresponding domain information may be used. According to various embodiments of present disclosure, the set of text snippets may also represent text data corresponding to social networks and mobile applications, clinical free text data, diagnosis reports, and request or complaints filed by end-users through online sources, and other text data.

In one example, a survey may be conducted for obtaining responses from students after undertaking an online exam. For conducting the survey, an open-ended question may be asked to the students is "what do you like about the exam?" to get students' responses. The open-ended question i.e., "what do you like about the exam?" is an example of a positive sense question. In one embodiment, the responses received from 5 different students are shown in Table 1 below.

TABLE 1

Responses received from different students who had just undergone a "Computer based online test". The students' responses are for the question "What do you like about the exam?"

| Student ID | Student's response (set of text snippets) |
|---|---|
| Student 1 | The ten minute reminder was useful |
| Student 2 | Time intimation before ten minutes |
| Student 3 | On screen calc |
| Student 4 | the PC given to me was quite fast |
| Student 5 | The clock is available on the display. |

The responses received from the students are considered to be a set of text snippets which is required to be tagged. For tagging the set of text snippets (student's response as per Table 1), a set of tags are used in the survey coding process. The tags may also be organized hierarchically in taxonomy. According to the present example, the set of tags required, for tagging the set of text snippets, are shown in Table 2 below.

TABLE 2

A sample set of tags organized hierarchically in taxonomy for the purpose of tagging response from students after a "Computer based online test".

| Sr. No | Tag-ID | Tag Description | Taxonomy Level and Grouping details |
|---|---|---|---|
| 1 | 1000 | Hardware Infrastructure (Group). | 1 |
| 2 | 1001 | Network connectivity. | 1.1 |
| 3 | 1002 | Server speed. | 1.2 |
| 4 | 2000 | Questions Details (Group) | 2 |
| 5 | 2100 | Question Types (Sub-group) | 2.1 |
| 6 | 2101 | Combinatorics questions. | 2.1.1 |
| 7 | 2102 | Mathematical questions. | 2.1.2 |
| 8 | 2103 | Data interpretation questions. | 2.1.3 |
| 9 | 2104 | Analytical ability questions. | 2.1.4 |
| 10 | 2200 | Question Difficulty Level (Sub-group) | 2.2 |
| 11 | 2201 | Challenging questions. | 2.2.1 |
| 12 | 2202 | Easy questions. | 2.2.2 |
| 13 | 3000 | Exam Software Features. (Group) | 3 |
| 14 | 3101 | On-screen timer. | 3.1 |
| 15 | 3102 | Calculator is on the screen. | 3.2 |
| 16 | 3103 | The ten minute reminder for remaining time. | 3.3 |
| 17 | 3104 | Word counter feature. | 3.4 |
| 18 | 3105 | User interface. | 3.5 |

TABLE 2-continued

A sample set of tags organized hierarchically in taxonomy for the purpose of tagging response from students after a "Computer based online test".

| Sr. No | Tag-ID | Tag Description | Taxonomy Level and Grouping details |
|---|---|---|---|
| 19 | 4000 | Other Comments (Group) | 4 |
| 20 | 4001 | No response or invalid comments | 4.1 |

The taxonomy level and the grouping details in the dotted decimal format correspond to the level and group identification in the hierarchy of tags.

Figure 5:
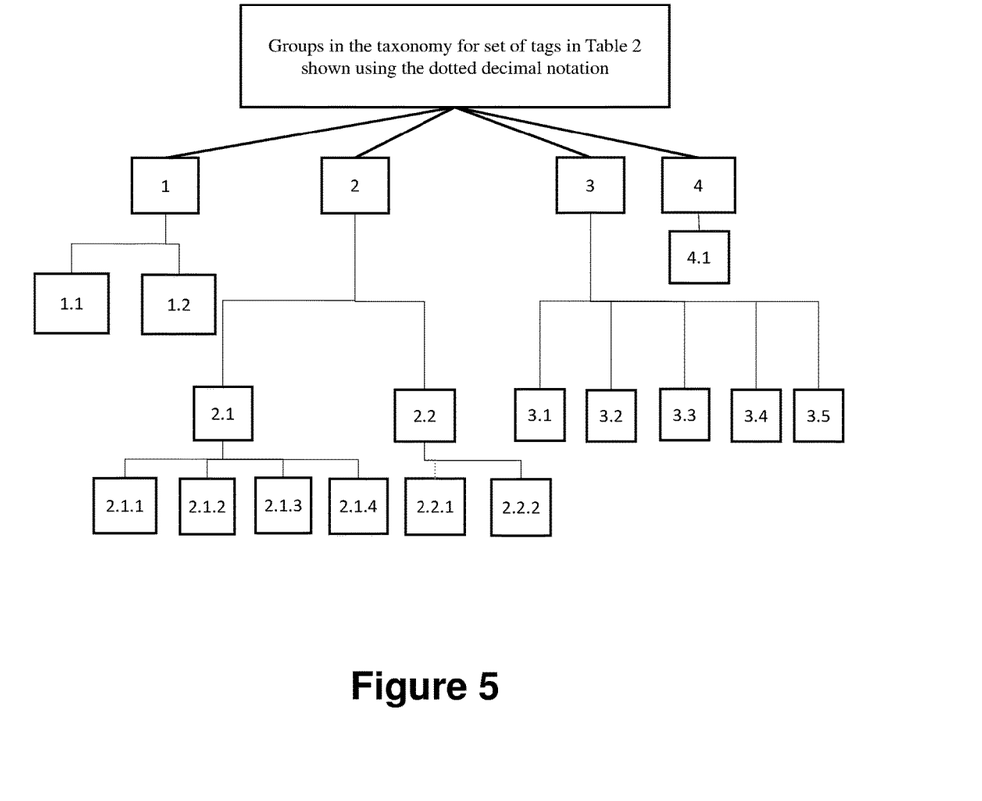
FIG. 5 illustrates a diagrammatic representation of hierarchy levels and groups in taxonomy for a set of tags, in accordance with an embodiment of the present subject matter.

It can be observed from the above Table 2, that the set of tags comprises 20 tags, and each tag of the set of 20 tags has a tag-id and a tag description, i.e., a set of words which describe the tag. Further, the tag-id is a unique identifier assigned for the tag having its associated set of words as its tag description. For example, the tag-id "3101" having "On-screen timer" as the set of 2 words associated with it as its tag description. Similarly, in an another example, the tag-id "3103" having "The ten minute reminder for remaining time" as the set of 7 words associated with it. Further, the tags may optionally be grouped and hierarchically organized in a taxonomy. The dotted decimal notation in the "Taxonomy level and grouping details" column in the Table 2 captures both the level in the taxonomy hierarchy as well as the grouping detail. For example, in the Table 2, the tag id "2101" is falling within the subgroup "2.1", and the subgroup "2.1" itself is falling within the group "2". Similarly the tag id "3103" is denoted in dotted decimal format as "3.3", and is falling within the group "3". As an example, the diagrammatic representation of the hierarchy levels and the groups in the taxonomy for set of tags in Table 2 is depicted in FIG. 5.

According to the present example, the receiving module 210 of the system 102 may be configured to receive the open-ended question (i.e., what do you like about the exam?), the set of text snippets (as shown in Table 1), and the set of tags (as shown in Table 2), as an input to the system 102. In addition to the necessary input of the set of text snippets and the set of tags, the receiving module 210 of the system 102 may also be configured to receive a domain information and a question type which are optional inputs. The domain information may contain a set of words which identify and briefly describe the domain from which the set of text snippets are gathered. For example, for the set of text snippets shown in Table 1, the domain information may be given as "Computer based online test". Further, the question associated with the set of text snippets may be categorized as one of the following three types of question, namely a positive-sense question or a negative-sense question or other-sense of question. For example, the question "What do you like about the exam?" associated with the set of text snippets in Table 1 would be categorized as a positive-sense question. As another example unrelated to Table 1, a question "What do you dislike about a particular entity?" is expected to solicit negative views/opinions about the particular entity and this question would be categorized as a negative-sense question. If there is no question to be related to the input text snippets or a question which does not explicitly solicit positive or negative views would be categorized as the other-sense question.

For the purpose of tagging the set of text snippets, the next step performed by a feature extractor module 212 of the system 102 is to determine one or more types of phrases such as noun phrase, prepositional phrase, verb phrase, adjective phrase or other types of phrases output by carrying out natural language parsing of the set of words that describe each tag of the set of tags and then to determine the headword of each such identified phrase. Thereafter, the feature extractor module 212 assigns a numeric weight to the word or the phrase signifying its relative importance based on frequency of the word as well as the headword of the phrase in the set of words associated with each tag of the set of tags. Further, in the next step, the feature extractor module 212 determines expected meaning of a word or a phrase identified from the parsing output of the set of words present in each tag of the set of tags. The steps carried out by the feature extractor module 212 are described in more details in subsequent paragraphs of the specification.

According to embodiments of present disclosure, the feature extractor module 212, of the system 102, may be configured to determine one or more types of phrases such as noun phrase, prepositional phrase, verb phrase, adjective phrase or other phrases output by carrying out natural language parsing of the set of words that describe each tag of the set of tags and determines the headword of each identified phrase. For example, consider the tag with tag-id "3103" with its associated describing set of words "The ten minute reminder for remaining time." The feature extractor module 212 may carry out natural language parsing of the set of words "The ten minute reminder for remaining time" as shown below.

---

Figure 6:
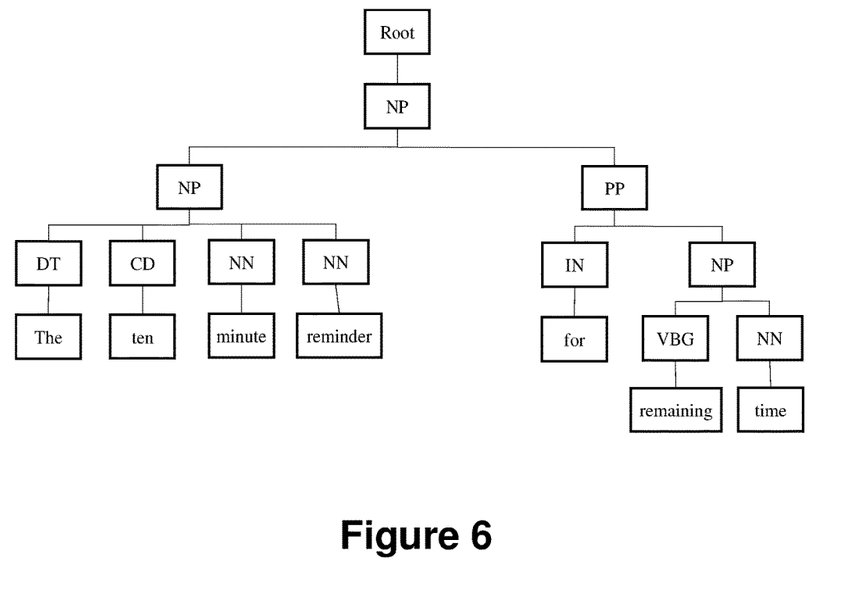
FIG. 6 is an example representation of a constituency parse tree for a set of words, in accordance with an embodiment of the present subject matter.

Constituency parse tree for the tag id 3103: "The ten minute reminder for remaining time."
(ROOT (NP (NP (DT The) (CD ten) (NN minute)
(NN reminder))(PP-preposition (IN for)(NP (VBG remaining) (NN time)))
(. .)))

---

The constituency parse tree for the set of words in this example "The ten minute reminder for remaining time" can also be represented pictorially as shown in FIG. 6.

As conventionally known, the existing parsing algorithms such as lexicalized parsing algorithm or dependency parsing algorithm identifies a headword of a phrase in a parse tree of a set of words. The headword of the entire set of words associated with a tag of the set of tags may be called as tag-headword of that tag. As an example of the phrases output by the natural language parsing in this example, the noun phrases and their associated headwords are given below. It must be understood to a person skilled in an art, that while determining level of a node in the parse tree, the ROOT node of the parse tree is at level 1 and level of any other node in parse tree is one more than the level of its parent node in the parse tree. In the Noun Phrase 1 (NP at level 2), i.e., "The ten minute reminder for remaining time", the corresponding headword is "reminder". The headword "reminder" is the tag-headword for the tag-id "3103". In the Noun Phrase 2 (NP at level 3), i.e., "The ten minute reminder", the corresponding headword is "reminder". In the Noun Phrase 3 (NP at level 4), i.e., "remaining time", the corresponding headword is "time".

Further, the feature extractor module 212 may be configured to determine frequency (i.e., count of number of instances) of the one or more words present in the tag of the set of tags. In the above example, the tag-id "2101" with its set of associated words "Combinatorics questions" may be considered for determining the frequency of words present in this tag. It can be clearly seen from the Table 2 that the tag id "2101" comprises of set of 2 words, i.e., "Combinatorics", and "questions". The feature extractor module 212 determines the frequency of each word ("Combinatorics", and "questions") present in the tag id "2101". Further, the feature extractor module 212 determines the frequency of the word "Combinatorics" as 1 (i.e., the word "Combinatorics" is appearing only once at the tag id 2101). Similarly, the feature extractor module 212 determines the frequency of the word "questions" as 6 (i.e., the word "questions" is appearing 6 times in the tag-ids 2101, 2102, 2103, 2104, 2201, and 2202). In another example, for determining the frequency, consider the tag-id "1002" with its set of associated words "Server speed". In this example, the feature extractor module 212 determines the frequency of the word "Server" as 1 and the frequency of the word "speed" as 1.

After determining the frequency and the headword, the feature extractor module 212 may be further configured to assign a numeric weight signifying relative importance to the one or more words in the set of words associated with the tag in the set of tags. The numeric weight is assigned in terms of w0, w1, w2, w3, w4, . . . , wn, where n is maximum number of words in the set of words, excluding any stopwords, associated with any tag of the set of tags. As conventionally known that the stopwords are used in natural language processing to identify words which are not considered significant for the primary purpose of a natural language processing task such as tagging text snippets. Stopwords tend to be common words in a language such as "a", "an", "the" "but", "how", "are" and the like. Stopwords may be configured as part of other modules 222 of the system 102. Further, each of the numeric weight w0, w1, w2, . . . , wn may be a fractional value within the range of 0 and 1, including the possibility of taking on the value of either 0 or 1 also. Further, the logic of computing numeric weight is explained in detail in the subsequent paragraphs of the specification.

According to one embodiment of the present disclosure, the feature extractor module 212 assigns the numeric value of 0 to the numeric weight w0. A stopword is assigned the numeric weight of w0. A node corresponding to a word in the parse tree of set of words associated with a tag is also assigned the same numeric weight as that of the word. If a node has only one child in the parse tree, then that node and its child are assigned same numeric weight. The feature extractor module 212 assigns the numeric weight "w1" to a headword of the set of words associated with a tag when the frequency of the headword in the set of tags is determined as 1 and the headword has the part of speech category corresponding to a noun type category (such as NN, NNS, NNP, NNPS part of speech categories according to the well-known standard Penn Treebank notation) and there is at least one word in the set of words associated with the tag having its part of speech category other than a noun type category. For example, consider the tag "3103", of the Table 2, having the set of words "The ten minute reminder for remaining time" for assigning the numeric weight. As explained in earlier paragraphs of this specification, the feature extractor module 212 identifies that the headword for the set of words "The ten minute reminder for remaining time" as "reminder" and frequency of the word "reminder" in the set of tags is 1. Further, part of speech category of the headword "reminder" in the parse tree is a noun type (NN, i.e., noun) and there is at least one word in the set of words associated with the tag "3103" that has part of speech category other than noun type, e.g., the word "ten" has its part of speech category CD (cardinal, i.e., a number). Hence, the feature extractor module 212, based on above discussed logic, assigns the numeric weight w1 to the word "reminder". According to an embodiment of present disclosure, in order to determine the numeric weight of another word in the set of words associated with the tag when the tag headword has frequency of 1 and noun type part of speech category, the feature extractor module 212 first identifies the level of the shortest phrase containing the tag headword in the parse tree and then determines number of phrases at that level. The feature extractor module 212 assigns the numeric weight w1 to the shortest phrase in the parse tree containing the headword of the entire set of words associated with the tag. If there are totally "k" number of phrases at the same level as that of the shortest phrase containing the headword of the entire parse tree, then the feature extractor module 212 assigns a numeric weight of w"k" to all the other phrases, i.e., excluding the shortest phrase containing the headword. The level of ROOT node in a parse tree is taken as 1 and the level of any other node in a parse tree is taken as one more than the level of its parent node of the parse tree. For example, in the above described parse tree for the tag "The ten minute reminder for remaining time", the level of the shortest phrase (i.e. the noun phrase at level 3) containing the headword "reminder" is determined as level 3. Number of nodes at level 3 in the above parse tree is determined to be 2 (i.e., "k"=2 for the parse tree). The feature extractor module 212 assigns numeric weight w1 to the shortest phrase (i.e. the noun phrase at level 3) in the parse containing the headword "reminder" and assigns numeric weight w2 to the other node not containing the headword "reminder". If a node has been assigned numeric weight w"p" (where the number "p" is one of 1, 2, 3, . . . upto, n), and the node has "q" number of children nodes, then each of the child node of the node, other than the tag-level headword is assigned numeric weight of w"p+q−1". Thus, the feature extractor module 212 makes use of the parse tree, headword of the set of words associated with the tag, frequency and the part of speech category of the words associated with the tag to determine the numeric weights of words in the tag. As can be seen from the Table 3 below, the tag "The 10 minute reminder for remaining time" of the tag id 3103 is considered for assigning the frequency and numeric weights.

TABLE 3

Example showing numeric weight assignment to the set of words associated with the tag id "3103".

| Word in the set of words associate with tag-id "3103" | Frequency in the example tagset of Table 2 | Part of speech category in the parse tree | Numeric weight assigned (with brief pointer to the reason) |
|---|---|---|---|
| The | 3 | DT | w0 (stopword) |
| Ten | 1 | CD | w3 (numeric weight assigned to parent NP node = w1 AND p = 1 AND q = 3) |
| minute | 1 | NN | w3 (numeric weight assigned to parent NP node = w1 AND p = 1 AND q = 3) |
| reminder | 1 | NN | w1 (headword AND frequency = 1 in the example tagset in Table 2 AND part of speech category = NN) |
| for | 1 | IN | w0 (stopword) |
| remaining | 1 | VBG | w3 (as described in earlier paragraphs of this specification) |
| time | 1 | NN | w3 (as described in earlier paragraphs of this specification) |

In the more general cases when a tag headword does not have a noun type part of speech category or a tag headword is determined to have a frequency of 2 or more, or if all words associated with a tag have a noun type part of speech category, then to decide numeric weight of a word in the set of words associated with such a tag, the feature extractor module 212 first assigns numeric weight w1 to the ROOT node of the parse tree. If a node has only one child node in the parse tree, then that node and its child node are assigned same numeric weight. A node corresponding to a stopword is assigned numeric weight w0. If a node in the parse tree has been assigned numeric weight w"p" (where the number "p" is one of 1, 2, 3, . . . upto n), and the node has "q" number of children nodes, then each child node of the node is assigned numeric weight of w"p+q−1" (as discussed above) if "p" is 1 or 2. Otherwise, if "p" is 3 or more, then each child node of the node is assigned numeric weight of w"p+q". It may be noted to a person skilled in art that there may be different scenarios, other than discussed above, for assigning numeric weight to the words present in the tag. According to embodiments of present disclosure, numeric weight may be also assigned to phrases present in the tag. As can be seen from the Table 4 below, the tag "Server Speed" of the tag id "1002" is considered as an example for assigning the frequency and the numeric weights.

TABLE 4

Example of numeric weight assignment to the set of words associated with the tag id "1002" in the tagset in Table 2.

| Word in the set of words associate with tag-id "1002" | Frequency in the example tagset of Table 2 | Part of speech category in the parse tree | Numeric weight assigned (with brief pointer to the reason) |
|---|---|---|---|
| Server | 1 | NN | w2 (numeric weight assigned to parent NP node = w1 AND p = 1 AND q = 2 AND all words in the set of associated words of the tag have same part of speech category) |
| speed | 1 | NN | w2 (numeric weight assigned to parent NP node = w1 AND p = 1 AND q = 2 AND all words in the set of associated words of the tag have same part of speech category) |

Further, to determine the expected meaning of each word of the set of words associated with each tag of the set of tags, the feature extractor module 212 first looks up in the word sense importance database 230 of the knowledge base 226. The word sense importance database 230 consists of following attributes for each entry in the database: (a) Set of words associated with the tag-id which describe the tag, (b) A word or a phrase, from the set of words associated with the tag-id, whose expected meaning is to be recorded in this entry in the word sense importance database 230, (c) A set of one or more word sense or meaning identifiers from the lexical database 228 of the knowledge base 226 corresponding to the word or phrase in the preceding attribute b, (d) Similar meaning words in the lexical database 228 for the word or phrase in the preceding attribute b, (e) Number of times positive feedback received from the user of the system for the word or phrase in the preceding attribute b, (f) Number of times negative feedback received from the user of the system for the word or phrase in the preceding attribute b, (g) Numeric weight signifying the relative importance as computed by the feature extractor module 212 for the word or phrase in the preceding attribute b, (h) Numeric weight signifying relative importance, suggested as part of the feedback by a user of the system, for the word or phrase in the preceding attribute b, (i) Similar meaning words for the word or phrase in the preceding attribute b as suggested as part of feedback by a user of the system, wherein the similar meaning words are not available as similar meaning words for the word or phrase in the preceding attribute b in the lexical database 228 of the knowledge base 226, (j) Optional information about a question-type as one of positive-sense question or a negative-sense question or other-sense question, and (k) Optional information about the domain related to set of text snippets.

As an example of the entry in the word sense importance database 230 done by the feature extractor module 212, consider the tag with tag-id 3103 with "The ten minute reminder for remaining time" as the set of associated words describing the tag entry.

TABLE 5

Example of the entries in the word sense importance database 230. Further, the table 3 uses WordNet ® as one possible type of the lexical database 228 in this example.

| Attribute Sr. No. in the word sense importance database 230 | Attribute value for entry #1 | Attribute value for entry #2 | Attribute value for entry #3 | Attribute value for entry #4 | Attribute value for entry #5 |
|---|---|---|---|---|---|
| a | The ten minute reminder for remaining time | The ten minute reminder for remaining time | The ten minute reminder for remaining time | The ten minute reminder for remaining time | The ten minute reminder for remaining time |
| b | ten | minute | reminder | remaining | time |
| c | WordNet ® Noun sense #1 | WordNet ® Noun sense #1 | WordNet ® Noun sense #1 | WordNet ® Verb sense #3 | WordNet ® Noun sense #2 |
| d | 10 | min. | reminder | be left | time |
| e | 0 | 0 | 0 | 0 | 0 |
| f | 0 | 0 | 2 | 1 | 0 |

TABLE 5-continued

Example of the entries in the word sense importance database 230. Further, the table 3 uses WordNet ® as one possible type of the lexical database 228 in this example.

| Attribute Sr. No. in the word sense importance database 230 | Attribute value for entry #1 | Attribute value for entry #2 | Attribute value for entry #3 | Attribute value for entry #4 | Attribute value for entry #5 |
|---|---|---|---|---|---|
| g | w3 | w3 | w1 | w3 | w3 |
| h | \<Not available as feedback not given for this attribute in previous execution iteration> | \<Not available as feedback not given for this attribute in previous execution iteration> | \<Not available as feedback not given for this attribute in previous execution iteration> | \<Not available as feedback not given for this attribute in previous execution iteration> | \<Not available as feedback not given for this attribute in previous execution iteration> |
| i | \<Not available as feedback not given for this attribute in previous execution iteration> | \<Not available as feedback not given for this attribute in previous execution iteration> | intimation, alert | Leftover, left over, left, odd, unexpended | \<Not available as feedback not given for this attribute in previous execution iteration> |
| j | Positive-sense question | Positive-sense question | Positive-sense question | Positive-sense question | Positive-sense question |
| k | Computer based online test | Computer based online test | Computer based online test | Computer based online test | Computer based online test |

Further, if the set of words associated with a tag-id and the word or phrase from that set of words whose expected meaning with respect to the set of tags and the set of text snippet is to be determined by the feature extractor module 212 is found in the word sense importance database 230 of the knowledge base 226, then the feature extractor module 212 checks if optional information i.e., the question-type information and the domain information is available in the input data received by the receiving module 210. If the optional information (question-type information and domain information) is available both in the input data received and in the word sense importance database 230, it should also match for the word or phrase whose expected meaning is to be determined by the feature extractor module 212. If this matching information is found, then the feature extractor module 212 uses the information in attributes "d" and "i" (discussed above) from the matching entry in the word sense importance database 230. This means that, the similar meaning words from the lexical database 228 in attribute "d" and the similar meaning words given as feedback by a user in attribute "i" as the expected meaning of the word or phrase from the set of words associated with the tag which is being looked up in the word sense importance database 230. Further, if no such matching entry is found in the word sense importance database 230, then the feature extractor module 212 uses existing word sense disambiguation techniques to determine expected meaning of the word or phrase using the set of words associated with the tag-id as well as the optional information about the question-type and the domain information if it is available. Further, in this case, the feature extractor module 212 creates an entry in the word sense importance database 230 of the knowledge base 226 about the word or phrase from the set of words associated with the tag-id.

After assigning the numeric weight, there is a need to identify same words or similar meaning words present in the tag as well as in the set of text snippets. The determining module 214 may be configured to determine correspondences between the one or more words (of the tag) and words present in the set of text snippets. This means that the corresponding matching of the words for each tag of the set of tags is performed with each text snippet in the set of text snippets, which results in identification of a same word or a similar meaning word present in the tag. Further, the same word is determined by mapping the one or more words (of the tag) with the words present in the set of text snippets while taking into account the root form of the word, also known as lemma. Further, the similar meaning word is determined by using a word-sense importance database 230. In the present example, the tag id "3103" is considered for determining the same words and similar meaning words in relative to the response of Student 2 (from Table 1) as shown in Table 6 below.

TABLE 6

Determining the same words and similar meaning words present in the tag and the text snippet.

| Tags id 3103 | Text Snippets (Response of Student 2 of Table 1) | Same Words (including consideration for the root form of the words) | Similar meaning words |
|---|---|---|---|
| The ten minute reminder for remaining time | Time intimation before ten minutes | ten==ten minute==minutes time==time | reminder==intimation |

It can be observed from the above Table 6, that the words present in the tag id 3103 are mapped with the response of the Student 2 i.e., a text snippet (present in Table 1). While mapping the words present in the tag id 3103, words like "ten", "minute", and "time" is exactly mapped with words "ten", "minutes", and "time" which are present in the text snippet (Response of Student 2). Thus, the word "ten", "minute", and "time" are determined as same words by the determining module 214. Now, the fourth word of the tag id 3103 i.e., "reminder" has a similar meaning with a word "intimation" present in the text snippet (Response of Student 2). Therefore, the determining module 214, by using the word-sense importance database 230, determines the word "reminder" as the similar meaning word present in the tag id 3103.

According to embodiments of present disclosure, if there are two or more same words/similar meaning words present in the tag, then a Stanford certainty factor algebra (CFA) may be used for combining numeric weight assigned (w1, w2, and w3 as mentioned above) for deriving a single value that represents a belief about how relevant is a particular tag to a given text snippet. For doing this, the belief factor computing module 216, of the system 102, computes a degree of belief (i.e., the belief factor) for each tag about its applicability for each text snippet. As mentioned above, the belief factor computing module 216 computes the belief factor by applying the certainty factor algebra (CFA) based upon the weight assigned to the same word and the similar meaning word. In one example, if this belief factor crosses a pre-specified threshold value T, then the tag assigning module 218, of the system 102, assigns the tag to the text snippet. Further, the value of the threshold T lies in the range of 0 and 1. Further, in the subsequent paragraphs of the specification, the computation of CFA, the computation of the numeric weight (w0, w1, w2, and w3), and the threshold value T are explained in detail.

In general, the CFA is a mechanism to encode a measure of belief (or disbelief) for a hypothesis, rule or event given relevant evidence as well as combining multiple such partial beliefs into a single belief regarding the conclusion. In the CFA, $0 \leq MB(H|E) \leq 1$ denote a measure of belief (MB) in hypothesis H for a given evidence E and similarly, $0 \leq MD(H|E) \leq 1$ denotes a measure of disbelief (MD). It is assumed that a hypothesis is either believed or disbelieved, but not both simultaneously (i.e., both MB(H|E) and MD(H|E) cannot be non-zero simultaneously). Further, the certainty factor for H given E may be defined as:

$$CF(H|E) = MB(H|E) - MD(H|E).$$

Further, the Certainty factor computation for a conclusion C given a set of premises is computed as follows. Let R be rule i.e., "if H then C" with its certainty denoted by CF(R). Now, if it is given (or have calculated) the certainty of H as CF(H), then $$CF(C) = CF(R) \times CF(H).$$

Similarly, for computing the certainty of conjunction and disjunction of hypotheses H1 and H2, the following equations may be used.

$$CF(H1 \text{ and } H2) = \min(CF(H1), CF(H2)), \text{ and}$$

$$CF(H1 \text{ or } H2) = \max(CF(H1), CF(H2))$$

According to embodiments of present disclosure, if there are two rules R1 and R2 with same conclusion C, then the certainty of C i.e., CF(C) may be computed as:

$$CF(R1) + CF(R2) - (CF(R1) \times CF(R2)), \text{ when both } CF(R1) \text{ and } CF(R2) \text{ are positive;}$$

$$CF(R1) + CF(R2) + (CF(R1) \times CF(R2)), \text{ when both } CF(R1) \text{ and } CF(R2) \text{ are negative;}$$

and $$(CF(R1) + CF(R2))/(1 - \min(|CF(R1)|, |CF(R2)|)),$$
when signs of CF(R1), CF(R2) are different.

Further, the computation of numeric weight (w0, w1, w2, w3) and the threshold (T) is explained below. According to embodiments of present disclosure, numeric weights w0, w1, w2, w3, i.e., the case of n=3 is considered. However, it must be understood to a person skilled in art, that the numeric weights can be considered for greater values of n also. Thus, according to one embodiment of present disclosure, numerical values associated with the numeric weights (w0, w1, w2, and w3, i.e., a case when n=3) may be seen in the below Table 7.

TABLE 7

Example of numeric weights and its description.

| Numeric weight value | Description of the numeric weights assigned |
|---|---|
| w0 = 0.0 | a word with the numeric weight "w0" is not important at all for tag assignment decisions. Such words are to be given 0 (zero) importance. Example of words which need zero importance are words such as "a, an, the, of" etc. Such words are also known as stopwords in the natural language processing parlance |
| w1 = 0.8 | a word with the numeric weight "w1" is the most important word for a particular tag and will cause the tag to be assigned to a text snippet containing the same word/similar meaning word. |
| w2 = 0.5 | a word with the numeric weight "w2" by itself is not sufficient to cause the tag assignment, but it may be combined with another word from tag description which has numeric weight of "w2" or higher (i.e., w1) for causing the tag assignment |
| w3 = 0.35 | a word with the numeric weight "w3" is not sufficient alone to cause the tag assignment, but it may be combined with at least two other words from tag description which have numeric weight of "w3" or higher (i.e., w1 or w2) for causing the tag assignment |

Based on constraints derived from the semantics associated with w1, w2, w3 and the threshold T, following set of equations, is formulated, which must be satisfied by w1, w2, w3 and T. Each of the constraints is explained in detail.

Constraint 1: Given that the numeric weights w0, w1, w2, w3 and T are defined to be within the range 0 (zero) to 1 (one), both inclusive.

$$0 \leq w1 \leq 1$$

$$0 \leq w2 \leq 1$$

$$0 \leq w3 \leq 1$$

$$0 \leq T \leq 1$$

$$w0 = 0$$

Constraint (2): Word/phrase with numeric weight assigned as w1 alone is sufficient to cause the assignment of corresponding tag to a text snippet.

$$w1 \geq T$$

Constraint (3): Word/phrase with numeric weight assigned as w2 or w3 alone is not sufficient to cause the corresponding tag assignment.

$$w2 < T$$

$$w3 < T$$

Constraint (4): A word/phrase with numeric weight assigned as w2 needs to be combined with another word/phrase from the same tag description having the numeric weight w1 or w2 to cause the corresponding tag assignment.

$$w1 + w2 - (w1 * w2) \geq T$$

$$w2 + w2 - (w2 * w2) \geq T$$

Constraint (5): A word/phrase with numeric weight w2 when combined with one more word/phrase from the same tag description having numeric weight w3 should not cause the corresponding tag assignment.

$$w3 + w2 - (w3 * w2) < T$$

Constraint (6): A word/phrase with numeric weight assigned as w3 when combined with another word/phrase from the same tag description having numeric weight w3 should not cause the corresponding tag assignment. If the $\alpha = w3 + w3 - (w3 * w3)$ and $\alpha \leq T$, then $$w3 + w3 - (w3 * w3) \leq T$$

Constraint (7): If there are three words/phrases in the tag description, each with numeric weight assigned as w3 and when these three words/phrases are combined together are sufficient to cause the corresponding tag assignment. It may be noted that, it is already denoted that the combined numeric weight of two words/phrases with numeric weight assigned as w3 using the variable alpha ($\alpha$) above i.e., Let $\alpha = w3 + w3 - (w3 * w3)$), then $$w3 + \alpha - (w3 * \alpha) \geq T$$

Thus, for deciding specific values of w1, w2, w3 and T, any feasible solution may be used that satisfies the constraints discussed above. In one implementation of present disclosure, the following values may be used (as shown in above Table 7) i.e., Threshold (T)=0.7, w1=0.8, w2=0.5, and w3=0.35.

On basis of above computation of the numeric weight and the threshold, and after determining the same words and similar meaning words, a belief factor computing module 216 computes a belief factor for the tags (Tag id 3103) by applying the certainty factor algebra (CFA) upon the numeric weights assigned to the same words and the similar words present in the tag (tag id 3103). Further, the certainty factor algebra (CFA) is applied by using:

$$[(\alpha 1 + \alpha 2) - (\alpha 1 * \alpha 2)],$$

wherein $\alpha 1$ and $\alpha 2$ are numerical values associated with the numeric weights of the same words and the similar words present in the tag (tag 3103, according to present example). Further, according to embodiments of present disclosure, the $\alpha 1$ and $\alpha 2$ may also indicate a belief factor computed by using the CFA.

For determining the belief factor for the tag id 3103 having the same words ("ten", "minute", and "time"), and similar meaning words ("reminder") may be considered. Since, there are 3 same words and 1 similar meaning word in the present example, the belief factor for the tag id 3103 may be determined in three steps by applying the certainty factor algebra. By referring the above Table 3 and Table 7, the certainty factor algebra may be applied by using [($\alpha 1$+$\alpha 2$)−($\alpha 1$*$\alpha 2$)]. In the present example, $\alpha 1$ is considered as 0.35 (i.e., the numerical value associated with the numeric weight w3 assigned to the word "ten"), and $\alpha 2$ as 0.35 (i.e., the numerical value associated with the numeric weight w3 assigned to the word "minute"). Thus, the output of the first step would be as follows:

$$[(\alpha 1 + \alpha 2) - (\alpha 1 * \alpha 2)] = [(0.35 + 0.35) - (0.35 * 0.35)] = 0.5775$$

In the second step, the certainty factor algebra is again applied using [($\alpha 1$+$\alpha 2$)−($\alpha 1$*$\alpha 2$)]. In the second step, $\alpha 1$ is considered to be 0.5775 (i.e., the output of the first step), and $\alpha 2$ is considered as 0.35 (i.e., the numerical value associated with the numeric weight w3 assigned to the word "time"). Thus, the output of the second step would be as follows:

$$[(\alpha 1 + \alpha 2) - (\alpha 1 * \alpha 2)] = [(0.5775 + 0.35) - (0.5775 * 0.35)] = 0.725375$$

In the third step, the certainty factor algebra is again applied using [($\alpha 1$+$\alpha 2$)−($\alpha 1$*$\alpha 2$)]. In the second step, $\alpha 1$ is considered to be 0.725375 (i.e., the output of the second step), and $\alpha 2$ is considered 0.8 (i.e., the numerical value associated with the numeric weight w1 assigned with the word "reminder"). The output of the third step would be as follows:

$$[(\alpha 1 + \alpha 2) - (\alpha 1 * \alpha 2)] = [(0.725375 + 0.8) - (0.725375 * 0.8)] = 0.945075$$

Therefore, the belief factor for the tag id "3103" is computed as 0.945075

After computing the belief factor for the tag id "3103", the tag assigning module 218 assigns the tag (tag id "3103") to the text snippet based upon a comparison of the belief factor with a threshold. In one embodiment of present disclosure, the tag assigning module 218 assigns the tag (tag id "3103") to the text snippet when the belief factor is equal to or greater than the threshold. In this present example, the threshold may be considered to be 0.7. Since, the belief factor computed for the tag (tag id "3103") is 0.945075 (which is greater than the threshold "0.7"), the tag assigning module 218 assigns the tag (tag id "3103") to the text snippet (i.e., Response of Student 2). The assigning of the tag (tag id "3103") is shown in Table 8 below.

TABLE 8

Assigning the tags applicable for the text snippets (i.e., Response of Student 2)

| Response of Student 2 | Applicable Tag |
| --- | --- |
| Time intimation before ten minutes | Tag id "3103": The ten minute reminder for remaining time |

According to embodiments of present disclosure, once the tag is assigned to the text snippet, the feedback may be received manually i.e., from the user (human expert or a human coder or any other person capable for providing the feedback). The user may review the assignment of the tags performed by the tag assigning module 218, and provide their feedback about the tagging. Further, a feedback module 220 is provided to receive feedback about the tag assignment to the text snippets. However, before receiving any feedback, the system 102 may identify a text, from the set of text snippets, for which the feedback is sought from the user. The text is identified using an active learning approach. According to embodiments of present disclosure, the feedback received may be used as historical data for machine learning. The active learning approach solicits the feedback about the tags assigned to the text snippets. In the historical data for machine learning, the feedback received may also be used for updating the knowledge base 226. The updates in the knowledge base 226 may be referred for tagging the current and future/next/unseen set of text snippets. Thus, the feedback module 220 utilizes the active learning technique for identifying the most informative tag assignments to the text snippets for which feedback should be sought from the user. The word sense importance database 230 is updated with the feedback sought from and if required the tag assignment step is repeated with the updated information status in the word sense importance database 230 after the feedback. Further, the updates in the knowledge base 226 also helps the system 102 in discriminating between different meanings of words and their relative importance present in the set of tags in context of an open-ended question. Thus, the time required by the system 102 may be significantly reduced while assigning the tags to the next set of text snippets.

Further, the feedback received comprises a positive feedback and negative feedback. In case of the positive feedback, the system 102 may assign a reinforce token to the belief factor computed for the tag. Further, the reinforce token indicates an appropriateness or applicability of each tag of the set of tags. The positive feedback also reinforces the belief regarding the word senses and the importance of the words present in the tags.

On the contrary, in case of the negative feedback, the knowledge base 226 is updated with a corrective action suggested by the user in the negative feedback. According to embodiments of present disclosure, the system 102 may also seek feedback from the user or human coder (i.e., "oracle") about whether a particular tag should have been assigned to a given text snippet. The feedback may be used in the machine learning process. Based upon the feedback received from the oracle, the system 102 updates the knowledge base 226 so that it can be used to improve tagging for current and future/next/unseen set of text snippets.

Figure 4:
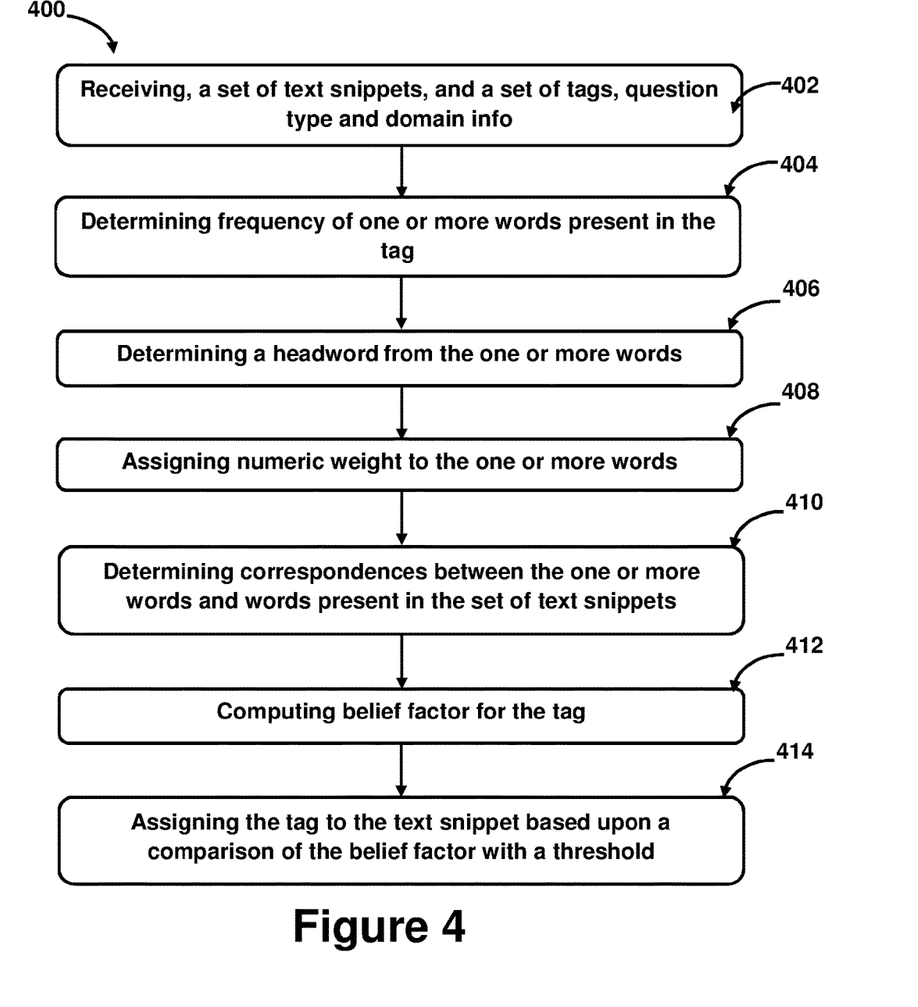
FIG. 4 illustrates a method for tagging the set of text snippets, in accordance with an embodiment of the present subject matter.

Referring now to FIG. 4, the method of tagging a set of text snippets with a tag of a set of tags organized in a taxonomy is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, a set of text snippets and a set of tags may be received. Further, an optional information such as question type and domain information may also be received as an input. Further, each tag of the set of tags comprises a set of words. According to one embodiment of present disclosure, the set of text snippets is representative of answers received in response to the open-ended question.

At block 404, frequency of one or more words present in the tag is determined.

At block 406, a headword from the one or more words present in the tag is determined. According to embodiments, the headword may be determined by parsing the one or more words present in the tag of the set of tags.

At block 408, a numeric weight may be assigned to the one or more words based on the frequency and the headword. Further, the numeric weight indicates relative importance of the one or more words in the tag with respect to other words present in other tags.

At block 410, correspondences between the one or more words and words present in the set of text snippets are determined, whereby the correspondences results in identification of a same word or a similar meaning word present in the tag. Further, the same word is determined by mapping the one or more words with the words present in the set of text snippets, and the similar meaning word is determined by using a word-sense importance database 230.

At block 412, a belief factor may be computed for the tag by applying certainty factor algebra (CFA) based upon the numeric weight assigned to the same word and similar meaning word present in the tag. Further, certainty factor algebra may be applied by using $[(\alpha 1+\alpha 2)-(\alpha 1*\alpha 2)]$, wherein $\alpha 1$ and $\alpha 2$ are values corresponding to the numeric weights assigned for the same word and similar meaning word present in the tag. Further, according to embodiments of present disclosure, the $\alpha 1$ and $\alpha 2$ may also indicate a belief factor computed by using the CFA.

At block 414, the tag, of the set of tags, may be assigned to the text snippet based on comparison of the belief factor with a threshold. In one embodiment, the tag may be assigned to the text snippet if the belief factor computed for the tag is equal to or greater than the threshold.

Although implementations for methods and systems for tagging the set of text snippets have been described in language specific to structural features and/or methods, it is to be understood that the appended claims are not necessarily limited to the specific features or methods described. Rather, the specific features and methods are disclosed as examples of implementations for tagging the set of text snippets using the tags of the set of tags organized in the taxonomy.

What is claimed is:

1. A method of tagging a set of text snippets with a tag organized in a taxonomy, the method comprising:
   receiving, by a processor, the set of text snippets and the tag of a set of tags, wherein the tag of the set of tags comprises a set of words;
   parsing, by the processor, the set of words in the tag into a parse tree with a root node and one or more levels to determine one or more types of phrases belonging to one or more parts of speech;
   determining by the processor,
      a frequency of one or more words present in the tag of the set of tags, and
      a headword from the one or more words present in the tag of the set of tags;
   assigning, by the processor, a numeric weight to the one or more words of the tag based on the frequency, parse tree, headword of the set of words associated with the tag, and the parts of speech category of words, wherein the numeric weight indicates relative importance of the one or more words in the tag with respect to other words present in other tags;

determining, by the processor, correspondences between the one or more words of the tag and words present in the set of text snippets, wherein the determining of the correspondences results in identification of a same word or a similar meaning word present in the tag;

computing, by the processor, a belief factor for the tag by applying a certainty factor algebra (CFA) based upon the numeric weight of the same word and the similar meaning word; and identifying, dynamically a text, from the set of text snippets, for which a feedback is sought from a user, and wherein the text is identified using an active learning approach;

receiving, dynamically a feedback about the tag assigned to the text snippet from the user, wherein the feedback received is used for historical learning by updating a knowledge base referred for tagging the set of text snippets and future set of text snippets using the set of tags present in the taxonomy; and updating the dynamic feedback in the knowledge base using the active learning approach assigned to the set of text snippets, wherein the active learning approach optimizes an amount of feedback received from the user, wherein the knowledge base comprises a word sense-importance database and a lexical resource, and wherein the word sense-importance database discriminates between one or more different meanings of a word and a relative importance of the set of words associated with a tag in context.

2. The method of claim 1, wherein the set of text snippets represents at least one of answers received in response to an open-ended question, text data corresponding to social networks and mobile applications, clinical free text data, diagnosis reports, request or complaints of end-users filed through online sources, and other text data.

3. The method of claim 1, wherein the certainty factor algebra (CFA) is, CFA=$[(\alpha+\alpha 2)(\alpha 1*\alpha 2)]$, wherein $\alpha 1$ and $\alpha 2$ are at least one of a belief factor and the numeric weight assigned for the same word and the similar meaning word present in the tag.

4. The method of claim 1, wherein the feedback received comprises a positive feedback and a negative feedback, and wherein:

on basis of the positive feedback, a reinforce token is assigned to the belief factor, and wherein the reinforce token indicates an appropriateness of each tag of the set of tags, and on basis of the negative feedback, the knowledge base is updated using a corrective action suggested by the user in the negative feedback.

5. A system for tagging a set of text snippets with a tag organized in a taxonomy, the system comprises:

a processor a memory coupled to the processor, wherein the processor executes a plurality of modules stored in the memory and wherein the plurality of modules comprising:

a receiving module to receive the set of text snippets and the tag of a set of tags, wherein the tag of the set of tags comprises a set of words;

a feature extractor module to parse the set of words in the tag into a parse tree with a root node and one or more levels to determine one or more types of phrases belonging to one or more parts of speech;

determine a frequency of one or more words present in the tag of the set of tags, determine a headword from the one or more words present in the tag of the set of tags, and assign a numeric weight to the one or more words of the tag based on the frequency, parse tree, headword of the set of words associated with the tag, and the parts of speech category of words, wherein the numeric weight indicates relative importance of the one or more words in the tag with respect to other words present in other tags;

a determining module to determine correspondences between the one or more words of the tag and words present in the set of text snippets, wherein the determining of the correspondences result in identification of a same word or a similar meaning word present in the tag, a belief factor computing module to compute a belief factor for the tag by applying a certainty factor algebra (CFA) based upon the numeric weight of the same word and the similar meaning word; and a feedback module to receive feedback about the tag assigned to the text snippet from a user, wherein the feedback received is used for historical learning by updating a knowledge base referred for tagging the set of text snippets and future set of text snippets using the set of tags present in the taxonomy, wherein the feedback module updates the dynamic feedback in the knowledge base using the active learning approach assigned to the set of text snippets wherein the active learning approach optimizes an amount of feedback received from the user, wherein the knowledge base comprises a word sense-importance database and a lexical resource, and wherein the word sense-importance database discriminates between one or more different meanings of a word and a relative importance of the set of words associated with a tag in context.

6. The system of claim 5, wherein the set of text snippets represents at least one of answers received in response to an open-ended question, text data corresponding to social networks and mobile applications, clinical free text data, diagnosis reports, request or complaints of end-users filed through online sources, and other text data.

7. The system of claim 5, wherein the certainty factor algebra (CFA) is, CFA=$[(\alpha 1+\alpha 2)(\alpha 1*\alpha 2)]$, wherein $\alpha 1$ and $\alpha 2$ are at least one of a belief factor and the numeric weight assigned for the same word and the similar meaning word present in the tag.

8. The system of claim 5, wherein the feedback received comprises a positive feedback and a negative feedback, and wherein:

on basis of the positive feedback, a reinforce token is assigned to the belief factor, and wherein the reinforce token indicates an appropriateness of each tag of the set of tags, and on basis of the negative feedback, the knowledge base is updated using a corrective action suggested by the user in the negative feedback.

* * * * *